I. TEETER.
FIFTH WHEEL.
APPLICATION FILED APR. 27, 1907.

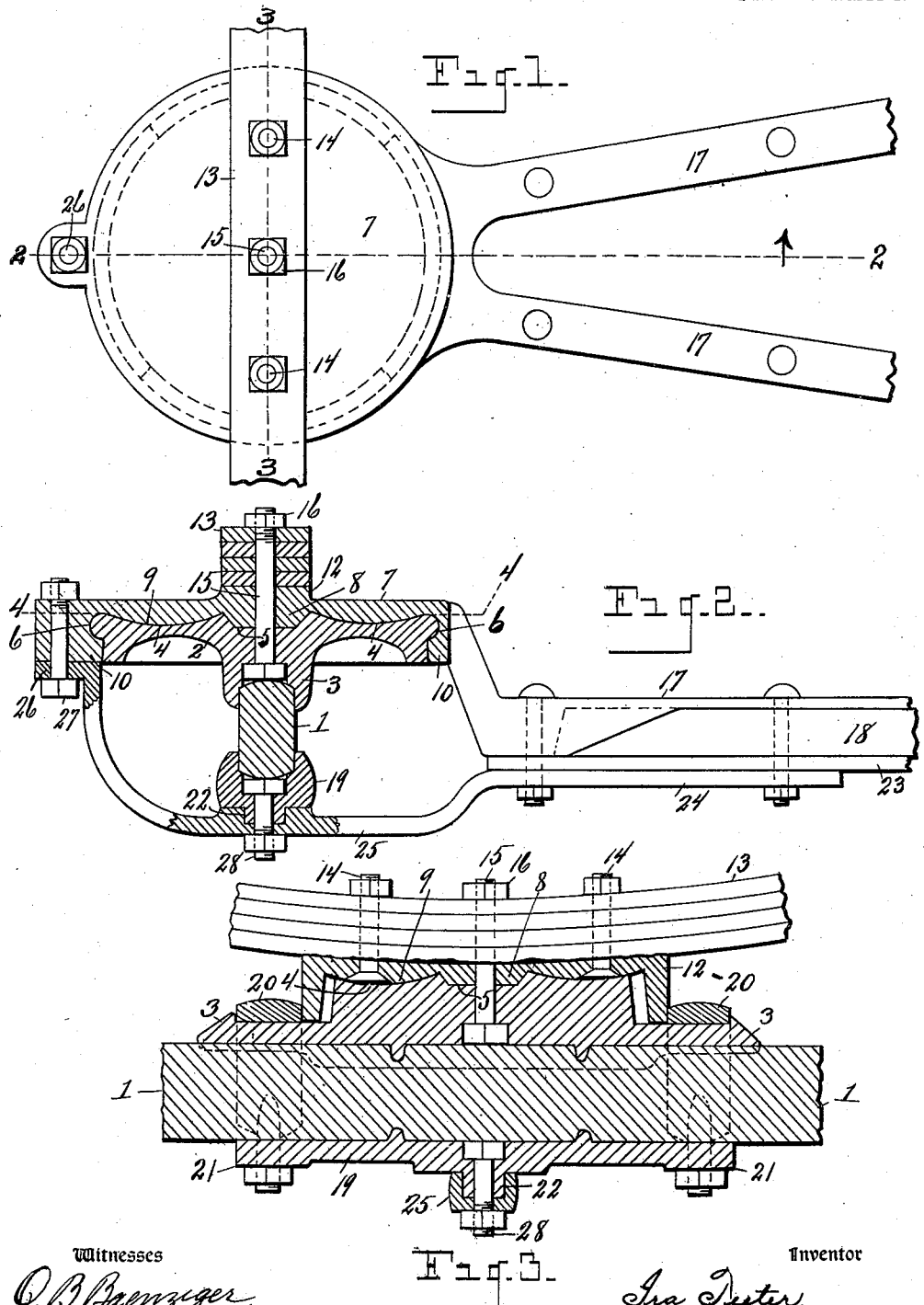

903,241.

Patented Nov. 10, 1908.
2 SHEETS—SHEET 2.

Witnesses
O. B. Baenziger.
J. G. Howlett

Inventor
Ira Teeter.
By E. S. Wheeler & Co.
Attorneys

THE NORRIS PETERS CO., WASHINGTON, D. C.

UNITED STATES PATENT OFFICE.

IRA TEETER, OF CHATHAM, ONTARIO, CANADA.

FIFTH-WHEEL.

No. 903,241.   Specification of Letters Patent.   Patented Nov. 10, 1908.

Application filed April 27, 1907. Serial No. 370,710.

*To all whom it may concern:*

Be it known that I, IRA TEETER, a citizen of the United States, residing at Chatham, in the county of Kent, Province of Ontario, Canada, have invented certain new and useful Improvements in Fifth-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to fifth wheels for vehicles, and consists in the construction and arrangement of parts hereinafter fully set forth and pointed out particularly in the claims.

The primary object of the invention is to provide a fifth wheel of simple, compact and strong construction, wherein conical bearings are provided upon which the movable members of the fifth wheel turn and which serve to relieve the connecting bolts from all lateral strain.

A further object is to provide means for securing the parts to the axle in a manner to enable the parts to be securely retained in place, and at the same time obviate a weakening of the axle incident in structures of this kind wherein the axle is pierced by the king-bolt.

A further object is to so construct the wearing parts as to prevent their wearing loose with use, obviating the liability of said parts rattling.

The above objects are attained by the structure illustrated in the accompanying drawings, in which:—

Figure 4:
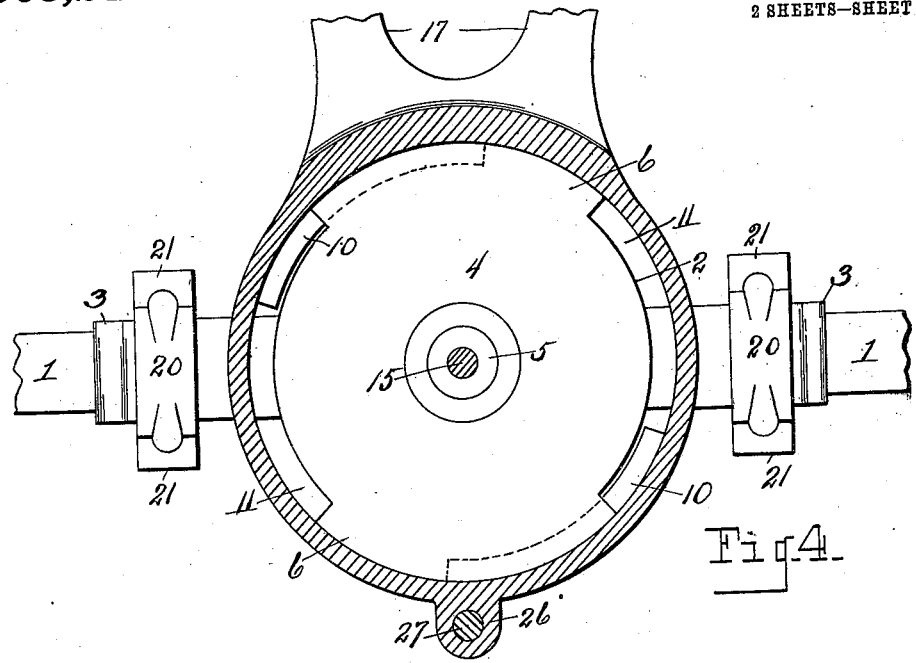
Figure 5:
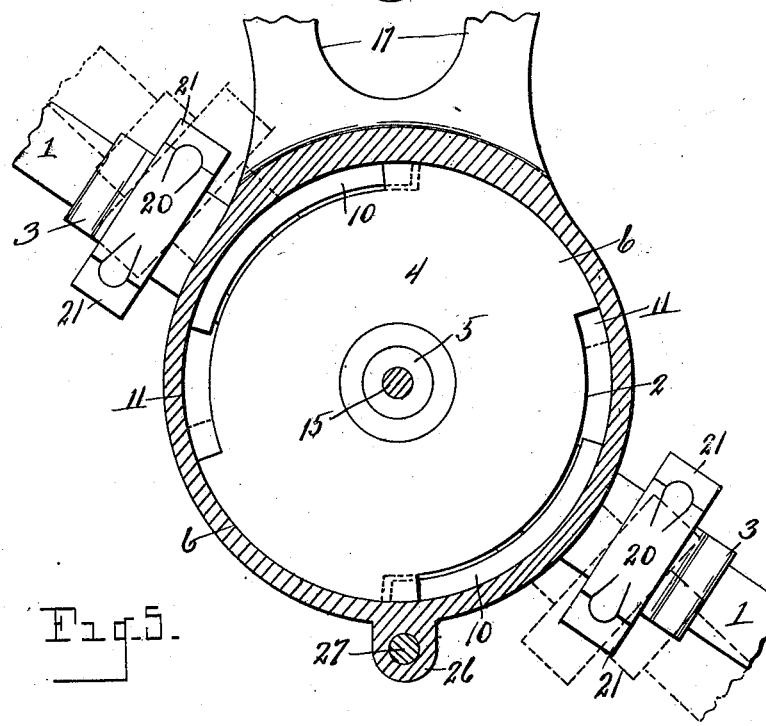

Figure 1 is a plan view of a fifth wheel structure involving my invention. Fig. 2 is a central transverse section as on line 2—2 of Fig. 1. Fig. 3 is a similar section longitudinally of the spring and axle as on line 3—3 of Fig. 1. Fig. 4 is a horizontal section on the dividing line between the upper cap plate and the lower rotative plate of the fifth wheel, as indicated by line 4—4 of Fig. 2. Fig. 5 is a similar section, showing the position of parts with the axle turned, and showing by dotted lines the movement necessary to disengage said parts.

Referring to the characters of reference, 1 designates the forward axle of a vehicle, and 2 the rotative lower disk of the fifth wheel which carries a transverse cross bar 3 which depends from and is formed integral with the lower side of said disk and which is channeled in its under face to rest upon the axle. The upper face of the lower disk 2 is provided with the circular concavity 4 and with the central conical depression 5. Projecting from the opposite edges of said rotative disk 2 at right angles to the cross bar 3 are the segmental flanges 6. Resting upon the circular plate or disk 2 is the upper disk or cap plate 7 having a central, depending cone 8 which fits into the conical recess of the disk 2 and having a rounded under face 9 which fits into the circular concavity of said disk 2, whereby the plate 7 becomes centrally seated upon the disk 2 and is held perfectly in place, at the same time affording ample bearing surface to prevent undue wear between said parts.

For the purpose of locking the upper cap plate and the lower rotative disk together, said cap plate is provided upon the inner margin thereof which embraces the perimeter of the disk 2, with the inwardly projecting segmental lips 10 with which the segmental flanges 6 of said disk 2 are adapted to normally engage to hold said parts together. The openings 11, however, between the ends of the segmental lips 10, are of such length as to permit the segmental flanges of the disk 2 to pass, and said openings are so positioned that it is necessary to swing the plate 2 so as to cause the cross bar 3 which rests upon the axle, to stand at an acute angle to the transverse axis of the fifth wheel, as shown by dotted lines in Fig. 5, before said flanges will be caused to register with said openings, when said parts will enter one into the other and may be locked together by rotating the disk 2 back to the position shown in Fig. 4. The parts are so formed that an accidental separation of the disk and cap plate forming the fifth wheel cannot occur when the transporting wheels are mounted on the ends of the axle, owing to the abrupt angle to which the axle must be turned in order to allow said parts to separate.

Crossing the upper face of the cap plate 7 parallel with the transverse axis thereof is a concaved seat 12 for the spring 13 which rests thereon and is secured thereto by the vertical tie-bolts 14 passing through said cap plate and through said spring, as clearly shown in Fig. 3.

To join the rotative disk 2 and the upper cap plate 7 at the axis of oscillation of said disk, the tie-bolt 15 is employed which passes upwardly through said disk and cap plate, and also through the spring 13, the upper end of said bolt receiving the nut 16.

Formed integral with and projecting rearwardly from the cap plate are the forked reach irons 17 with which the forward ends of the forked reach 18 are secured.

The axle 1 is seated in a cross bar 19 which extends parallel with the cross bar 3 of the disk 2, and said bars are securely fastened to the axle by means of the clips 20 whose threaded ends pass through the ears 21 on the ends of the bar 19. Upon the under side of the cross bar 19 is a depending bearing boss 22. Secured to the reach plates 23 which lie upon the under side of the forked reach, is a forked brace member 24 which unites in a single forwardly extending member 25 that crosses at right angles the under face of the bar 19 and is provided with a socket that receives the bearing boss 22. The terminal portion of the forwardly extending member 25 of the forked brace curves upwardly into contact with the under face of the cap plate 7 at the forward edge thereof and is provided with a foot 26 through which passes a bolt 27 that joins said member to said plate, thereby firmly connecting the reach with the front and rear edges of the cap plate. Passing through the cross bar 19 and through the brace 25 is a bolt 28 which pivotally unites said parts.

It will now be understood that the bearing boss 22 and the bearing cone 8 form the bearing parts upon which the movable members of the fifth wheel swing, and that said bearing parts relieve the bolts 15 and 28 from all lateral strain. It will further be evident that the parts of the fifth wheel which have a relative movement are so shaped and so fitted together as to afford an unusual wearing surface, thereby insuring great durability and obviating the liability of said wearing parts becoming loose. It will further be evident that because of the manner herein shown of mounting the parts upon the axle, the axle is not pierced by any of the connecting bolts, thereby obviating the weakening thereof.

Having thus fully set forth my invention, what I claim as new and desire to secure by Letters Patent, is:—

1. In a fifth wheel, the combination of an axle, a cap plate, a rotative disk seated within the cap plate and detachably associated therewith to rotate about its axis, said disk having a depending cross bar seated on the axle, said cap plate having integral reach irons which extend onto the reach, a lower cross bar in which the axle is seated, means connecting the cross bar of said disk and said lower cross bar to clamp them to the axle, a lower brace extending from the reach to the forward edge of the cap plate and crossing said lower cross bar, said brace member having a socket therein, a bearing boss on the lower cross bar seated in said socket, and bolts tying said parts together.

2. In a fifth wheel, the combination of an axle, a rotative disk having a cross bar mounted on the axle, said disk consisting of a circular portion having projecting flanges, a cap plate fitted on said disk having segmental lips adapted to engage said flanges, said cap plate having rearwardly extending reach irons adapted to engage the reach, a lower cross bar in which the axle is seated, means connecting the cross bar of said disk and the lower cross bar to clamp them to the axle, a lower brace attached to the reach and crossing and supporting said lower bar, and means effecting a pivotal connection between the bar and brace.

3. In a fifth wheel, the combination of a rotative disk having a conical central socket and a circular concavity in its upper face, a cap plate seated on said disk having a central cone which enters said socket, and a rounded face which lies in said concavity, interlocking members upon the cap plate and disk to detachably join them, said disk having a cross bar upon its under face adapted to seat upon the axle, the lower cross bar embracing the under side of the axle, means for clamping said bars to the axle, a lower brace rod crossing the lower cross bar, means effecting a pivotal union between said bar and brace rod, and a bolt connecting the rotative disk and cap plate.

4. In a fifth wheel, the combination of the axle, a rotative disk having a cross bar upon its lower face seated upon the axle, said disk having a conical socket in its upper face, a cap plate seated on said disk and supported thereby, said plate having a depending bearing cone which enters said socket, means for detachably connecting said disk and plate, reach irons extending from the cap plate to the reach, a lower brace extending from the reach to the forward edge of the cap plate, a transverse bar having a depending bearing boss journaled in said brace and having a seat which receives the under side of the axle, an axle seated in said bar and supporting the rotative disk, and means for securing said bar and disk to the axle.

In testimony whereof, I sign this specification in the presence of two witnesses.

IRA TEETER.

Witnesses:
O. B. BAENZIGER,
I. G. HOWLETT.